3,826,808
PROCESS FOR RECOVERING TUNGSTEN FROM ALKALINE BRINE

Ivan L. Nichols and Raymond O. Dannenberg, Salt Lake City, Utah, assignors to the United States of America as represented by the Secretary of the Interior
No Drawing. Filed Aug. 2, 1973, Ser. No. 385,214
Int. Cl. C01g 41/00
U.S. Cl. 423—54      4 Claims

ABSTRACT OF THE DISCLOSURE

Tungstate ion in alkaline brine is complexed with a dihydroxy phenolic compound prior to extraction with an organic solvent or a resin.

---

Alkaline brines containing tungsten in the form of tungstate are conventionally formed by digestion of tungsten ores or concentrates with strong caustic. In addition, in some instances they occur naturally such as Searles Lake, Calif. brine. Prior art processes for recovery of tungsten from the alkaline brines have required complete or partial neutralization of the alkalinity, followed by tedious precipitation or crystallization techniques.

An alternative solvent extraction procedure is disclosed in U.S. Pat. 3,316,058; however, this procedure also requires at least partial neutralization.

It has now been found, according to the process of the invention, that tungsten, in the form of a chelate complex, may be efficiently extracted from an alkaline brine by initial formation of a complex with a dihydroxy phenolic compound, followed by extraction with either a quaternary ammonium salt liquid extractant or an anion exchange resin.

Alkaline brines suitable for processing by the method of the invention may be prepared by digestion of a tungsten ore, such as wolframite, in a strong solution of caustic such as sodium or potassium hydroxide. Or, as mentioned above, they may occur naturally. Naturally occurring brines usually have pH values of about 9 to 11 and contain about 0.05 to 0.06 percent tungsten, 16 to 18 percent sodium chloride, 7 to 8 percent sodium sulfate, 4 to 5 percent sodium carbonate, 1 to 2 percent sodium borate, 4 to 5 percent potassium chloride and minor amounts of other salts such as sodium phosphate, sodium sulfide, sodium arsenate and lithium phosphate. Brines obtained by processing of ores will generally be of similar composition, but may vary considerably depending on the nature of the ore and the specific processing steps employed.

The complexing agent consists of a dihydroxy phenolic compound capable of forming a chelate complex with tungstate ion. These compounds are characterized by the presence of at least one benzene ring having hydroxyl groups on adjacent carbon atoms in the benzene ring. They may contain more than one benzene ring, e.g., derivatives of biphenyl or naphthalene, and other substituents such as aldehyde groups, carboxylic groups, etc. Specific examples of suitable compounds are pyrocatechol, 4-tert-butylpyrocatechol, pyrogallol, phenylpyrocatechol, 2,3-naphthalenediol and 3,4-dihydroxy benzaldehyde.

Dihydroxy phenolic compounds complex with the tungstate ion in the stoichiometric ratio of 2:1 as follows:

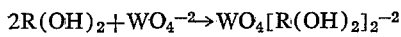

However, it has been found that the complexing agent also reacts with boron; consequently, an amount of complexing agent stoichiometrically equivalent to the tungsten plus boron is preferred. The complexing agent may be added to either the alkaline brine or to the extractant, where the latter is a liquid.

The resulting chelate complex may then be extracted with either a liquid extractant comprising a quaternary ammonium salt, or with an anion exchange resin. The liquid extractant consists essentially of a water-insoluble long chain quaternary ammonium salt dissolved in an inert carrier such as kerosine, benzene, a high molecular weight alcohol or mixtures thereof. A mixture of kerosine and about 2 to 10 percent isodecanol has been found to be particularly effective. This extractant has been found to be uniquely effective in the process of the invention, other conventional organic extractants such as organophosphates, ketones, alcohols, primary, secondary and tertiary amines having been found to be ineffective in extraction of the complexed tungstate.

Suitable quaternary ammonium salts include those having chloride or sulfate as the acid radical, and having at least one organic radical of sufficient length to make the compound water-insoluble. A particularly preferred compound is one having the formula $R_3(CH_3)NCl$ in which the R groups are saturated straight-chain $C_8–C_{10}$ hydrocarbon groups, with the $C_8$ group predominating. This compound is available commercially under the name of Aliquat 336 from General Mills Corporation. Suitable concentrations of the quaternary ammonium salt in the carrier will range from about 0.15 to 0.5 molar.

Extraction may be accomplished by means of conventional apparatus, such as shakers, mixer-settler units, extraction columns, etc. Suitable amounts of extractant will range from about 0.5 to 3 volumes per volume of brine. Efficient extraction is usually achieved at room temperature; however, temperatures of about 25 to 60° C. are generally satisfactory. Extraction is usually substantially complete in about 10 to 30 minutes.

After the organic and aqueous phases have been allowed to separate, the tungsten is recovered from the organic phase by stripping with a moderately strong solution of sodium hydroxide, whereby a concentrated sodium tungstate solution is formed. The concentration of the sodium hydroxide solution should be about 1 to 6 normal, and the amount of sodium hydroxide solution should be approximately the stoichiometric amount required to form sodium tungstate.

Tungsten is then recovered by means of conventional procedures for recovering the metal from alkaline liquors, e.g., precipitation as tungsten oxide by acidification of concentrated sodium tungstate strip liquor, and reduction of the oxide to the metal with hydrogen.

Anion exchange resins that may be used for extracting the chelate complex include conventional strong base quaternary ammonium, as well as weak base polyamine, resins. The preferred strong base resins are usually characterized by the presence of quaternary ammonium groups fixed to a polystyrene-divinylbenzene matrix, and are conventionally prepared by chloromethylation of the copolymer bead using chloromethyl methyl ether and a Friedel-Crafts catalyst, followed by reaction of the product with a tertiary amine such as trimethylamine or dimethylethanolamine, in the presence of a polar solvent such as water, to form a quaternary ammonium salt.

The resin is usually employed in a mesh size of about 20 to 50, and extraction is accomplished by stirring, or otherwise mixing, the resin with the complexed brine in an amount of about 5 to 15 wt. percent of resin for a period of about 5 to 30 minutes.

Again, sodium hydroxide solution is used to strip the tungsten from the resin as tungstate, and the metal recovered as described above.

The invention will be more specifically illustrated by the following examples.

EXAMPLE 1

A synthetic brine resembling a Searles Lake, California, Trona processing plant composite plant effluent was prepared by dissolving the appropriate salts in water. The brine had the following approximate percentage composition by weight:

| | |
|---|---|
| KCl | 1.9 |
| NaCl | 16.7 |
| $Na_2CO_3$ | 3.7 |
| $Na_2SO_4$ | 6.8 |
| $Na_2B_4O_7$ | .4 |
| $Na_3PO_4$ | .2 |
| $NaLi_2PO_4$ | .06 |
| NaBr | .03 |
| $Na_2WO_4$ | .0072 |

This brine has a pH of about 9.7. Equal volumes of brine and an organic solution containing 0.25 mole per liter of Aliquat 336, 2 volume percent isodecanol and varying amounts of pyrocatechol dissolved in kerosine were shaken together by a wrist action shaker for 1 hour. The phases were separated, and the percentage of the tungsten extracted was determined radiometrically. Table 1 shows the relationship between the tungsten extracted and the pyrocatechol concentration.

TABLE 1

| Pyrocatechol added, g./l.: | Tungsten extracted, Percent |
|---|---|
| 0 | 2.5 |
| 1 | 30 |
| 10 | >99 |

EXAMPLE 2

Similar to Example 1 except actual waste brine from a Trona processing plant was used. The brine composition was similar to that shown in Example 1 with the following additional salts in weight percent: 0.2 $Na_2S$ and 0.03 $Na_2AsO_4$. Samples were also taken periodically during the test to determine the effect of contact time on tungsten extraction. Table 2 shows the results.

TABLE 2

| | Tungsten extracted, percent | | | |
|---|---|---|---|---|
| Contact time | 10 mins. | 30 mins. | 60 mins. | 120 mins. |
| Pyrocatechol added, g./l.: | | | | |
| 2.5 | 5 | 18 | 57 | 85 |
| 5.0 | 25 | 62 | 99 | >99 |
| 10.0 | 45 | 93 | >99 | >99 |
| 15.0 | 76 | 95 | >99 | >99 |

EXAMPLE 3

The Trona plant waste brine described in Example 2 was treated with 10 grams of pyrocatechol per liter. One hundred milliliter portions of complexed brine were stirred for various time intervals with 10-gram portions of a strong base quaternary ammonium anion exchange resin. Tungsten extraction from the brine was determined radiometrically with the results shown in Table 3.

TABLE 3

| Contact time, min.: | Tungsten extracted, percent |
|---|---|
| 10 | 54 |
| 30 | 83 |
| 45 | 93 |

We claim:
1. A process for recovery of tungsten from alkaline brine comprising (1) addition of a dihydroxy phenolic compound to the brine to complex the tungstate anion, (2) extraction of the complexed tungstate from the brine by means of an extractant from the group consisting of a solution of a quaternary ammonium salt in an inert organic solvent and an anion exchange resin, and (3) stripping the extractant or resin with sodium hydroxide solution to recover the tungsten as a concentrated sodium tungstate solution.

2. The process of claim 1 in which the dihydroxy phenolic compound is pyrocatechol.

3. The process of claim 1 in which the extractant comprises a solution of a compound of the formula $R_3(CH_3)NCl$, where the R groups are saturated straight-chain $C_8$–$C_{10}$ hydrocarbon groups, in an inert organic solvent.

4. The process of claim 1 in which the extractant comprises a quaternary ammonium anion exchange resin.

References Cited

UNITED STATES PATENTS

| 2,968,527 | 1/1961 | Baker | 423—54 |
|---|---|---|---|
| 3,047,361 | 7/1962 | Hubbard et al. | 75—101 BE |

FOREIGN PATENTS

| 798,326 | 7/1958 | Great Britain | 423—54 |
|---|---|---|---|

HERBERT T. CARTER, Primary Examiner

U.S. Cl. X.R.

75—108; 101 BE; 423—61